United States Patent
Cannon et al.

(10) Patent No.: US 7,363,454 B2
(45) Date of Patent: Apr. 22, 2008

(54) STORAGE POOL SPACE ALLOCATION ACROSS MULTIPLE LOCATIONS

(75) Inventors: David Maxwell Cannon, Tucson, AZ (US); Colin Scott Dawson, Tucson, AZ (US); Barry Fruchtman, Tucson, AZ (US); Charles Alan Nichols, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/009,210

(22) Filed: Dec. 10, 2004

(65) Prior Publication Data

US 2006/0129779 A1    Jun. 15, 2006

(51) Int. Cl.
*G06F 12/00* (2006.01)
*G06F 17/30* (2006.01)

(52) U.S. Cl. ............... 711/170; 707/200; 707/205

(58) Field of Classification Search ........... 711/100, 711/170; 707/1, 10, 200, 205
See application file for complete search history.

(56) References Cited

U.S. PATENT DOCUMENTS

| | | | |
|---|---|---|---|
| 6,341,333 B1 | 1/2002 | Schrieber et al. | |
| 6,442,650 B1 | 8/2002 | Bachmat et al. | |
| 6,643,083 B2 | 11/2003 | Korst et al. | |
| 6,687,735 B1 | 2/2004 | Logston et al. | |
| 7,099,900 B1 * | 8/2006 | Bromley et al. | ............ 707/204 |
| 2002/0019908 A1 | 2/2002 | Reuters et al. | |
| 2002/0083118 A1 | 6/2002 | Sim | |
| 2002/0156974 A1 | 10/2002 | Ulrich et al. | |
| 2003/0028722 A1 | 2/2003 | Bachmat et al. | |
| 2003/0031176 A1 | 2/2003 | Sim | |
| 2003/0172146 A1 | 9/2003 | Collins | |
| 2005/0273451 A1 * | 12/2005 | Clark et al. | .............. 707/1 |
| 2007/0083575 A1 * | 4/2007 | Leung et al. | ............ 707/205 |

OTHER PUBLICATIONS

PCT Search Report dated Jun. 2, 2006 for PCT/EP2005/055162 filed Nov. 10, 2005.
PCT Written Opinion dated Jun. 2, 2006 for PCT/EP2005/055162 filed Nov. 10, 2005.

* cited by examiner

*Primary Examiner*—Jack Lane
(74) *Attorney, Agent, or Firm*—Janaki K. Davda; Konrad Rayner & Victor LLP

(57) ABSTRACT

Techniques are provided for allocating storage space to a storage pool. A request for storage space for the storage pool is received. A list of locations associated with the storage pool is obtained, wherein the locations are capable of spanning multiple file systems or multiple directories within a single file system. One or more allocation techniques are applied to select one or more locations at which storage space is to be allocated. The storage space is allocated at the selected one or more locations.

12 Claims, 9 Drawing Sheets

STORAGE POOL SPACE ALLOCATION ACROSS MULTIPLE LOCATIONS

BACKGROUND

1. Field

Implementations of the invention relate to storage pool space allocation across multiple locations.

2. Description of the Related Art

There are various known techniques for storing data for a storage management application. These storage techniques are often implemented using a storage management server (e.g., a Tivoli Storage Manager™ product marketed by International Business Machines Corporation (IBM)) that can store data objects, such as user files, in one or more locations within storage pools. The storage-management server frequently uses a database for tracking information about the stored objects, including the attributes and locations of the objects in the storage pools.

After being stored on the storage management server, data objects can be moved and copied using data-transfer operations, such as migration in which objects are moved from one storage pool to another storage pool. For example, an object may be migrated from relatively fast and expensive storage such as a disk to relatively slow and inexpensive storage such as tape. Additional data transfer operations include storage pool backups in which objects in one storage pool are duplicated or copied to another pool for availability and recovery purposes.

Some computing systems facilitate all-disk storage solutions. However, these computing systems are not able to ensure that sufficient storage space is made available on-demand. That is, these computing systems require pre-allocation of large amounts of storage space in advance.

Storage pools are groupings of volumes, and the volumes may be represented by a grouping of data that may be physical or logical. In conventional computing systems, each storage pool is associated with a single directory of a single file system. A file system may be described as a system that manages Input/Output (I/O) operations to files and controls the format of information on storage devices. In particular, a file system allows applications to create and manage files on storage devices and to perform I/O operations to those files. A file system may also be described as a collection of files and certain attributes associated with those files.

A storage management server stores data from a storage management client in its own storage space. The storage management server is able to perform backup, archival, space management, and other operations in which data is stored in storage pools on behalf of storage management clients. This storage space may include random access volumes or sequential access volumes. When a file is used in random access mode, portions of the file may be written non-sequentially. When a file is used in sequential access mode, the storage management server stores the data sequentially. Both random access volumes and sequential access volumes may be pre-allocated or acquired dynamically. Traditionally, files are created and deleted from a volume on an as-needed basis, and space for the files is acquired on an as-needed basis. Such files are typically created and deleted within a single directory of a file system. This limitation prevents storage creation within multiple directories of a file system or within multiple file systems, which imposes a restriction on the capacity and scalability of random access and sequential access storage pools.

Thus, there is a continued need in the art for improved storage pool space allocation.

SUMMARY OF THE INVENTION

Provided are a method, article of manufacture, and system for allocating storage space to a storage pool. A request for storage space for the storage pool is received. A list of locations associated with the storage pool is obtained, wherein the locations are capable of spanning multiple file systems or multiple directories within a single file system. One or more allocation techniques are applied to select one or more locations at which storage space is to be allocated. The storage space is allocated at the selected one or more locations.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of the invention.

Figure 1A:
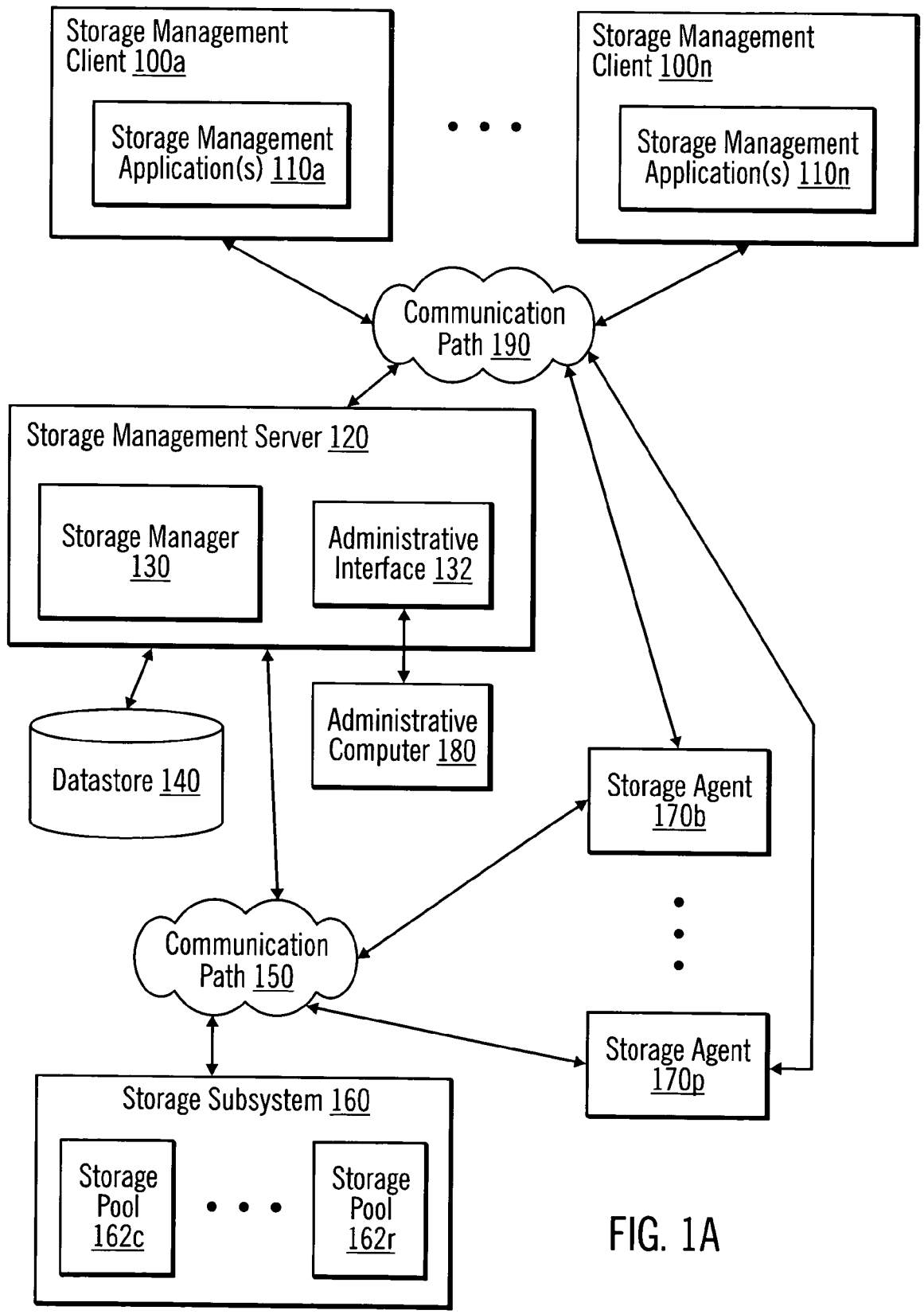
FIGS. 1A and 1B illustrate in a block diagram, a computing environment in accordance with certain implementations of the invention.
Figure 1B:
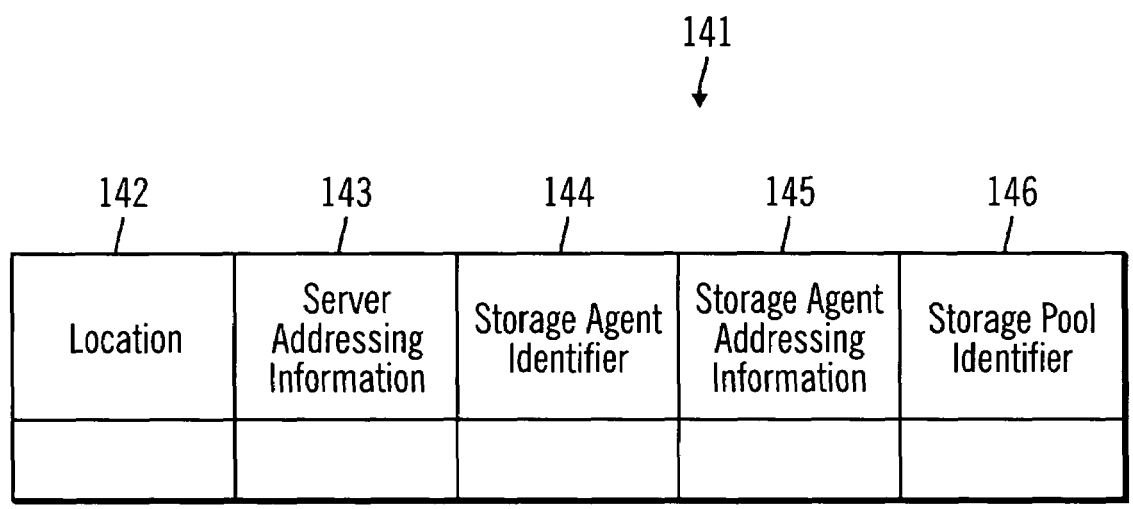

FIGS. 1A and 1B illustrate, in block diagrams, a computing environment in accordance with certain implementations of the invention. Storage management clients 100a . . . 100n include one or more storage management applications 110a . . . 110n, respectively. The character suffixes of "a" and "n" and the ellipses (e.g., 100a . . . 100n) indicate that any number of referenced elements (e.g., storage management clients or storage management applications) may be included in the computing environment. Storage management clients 100a . . . 100n may comprise any type of computing device. Storage management clients 100a . . . 100n are connected to a storage management server 120 and storage management agents 170b . . . 170p via a communication path 190. The storage management applications 110a . . . 110n may store data on the storage management server 120 or access data managed by the storage management server 120.

A storage subsystem 160 has a storage communication path 150 to storage management server 120 and storage agents 170b . . . 170p. For example, the communication path 150 may be a storage network. As another example, the communication path 150 may connect Small Computer System Interface (SCSI) attached storage devices forming storage subsystem 160 to the storage management server 120. Storage subsystem 160 includes storage pools 162c . . . 162r. The character suffixes of "c" and "r" and the ellipses (e.g., 162c . . . 162r) indicate that any number of storage pools may be included in the storage subsystem 160. The character suffixes of "b" and "p" and the ellipses (e.g., 170b . . . 170p) indicate that any number of storage agents may be included in the computing environment. The storage management server 120 and storage agents 170b . . . 170p may be described as computing devices. The storage agents 170b . . . 170p may fulfill requests (e.g., storage or retrieval requests) submitted by storage management clients 100a . . . 100n to storage management server 120. The storage agents 170b . . . 170p may be described as sub-servers that perform Input/Output (I/O) operations at remote systems, but that store results in coordination with the storage management server 120. The storage management server 120 and storage agents 170b . . . 170p may implement different file systems (e.g., a Windows® operating system file system or a UNIX® operating system file system).

The storage management server 120 may comprise any type of computing device. The storage management server 120 includes a storage manager 130, and an administrative interface 132. A datastore 140 is coupled to the storage management server 120.

The datastore 140 includes a table 141 (FIG. 1B) that provides, for each storage pool 162c . . . 162r, a list of locations for the storage pool and mappings between server addressing information and storage agent addressing information to access data within the storage pool 162c . . . 162r. In FIG. 1B, table 141 includes columns for: a location 142, server addressing information 143, a storage agent identifier 144, storage agent addressing information 145, and a storage pool identifier 146. The locations 141 associated with a single storage pool identifier 146 of a storage pool may be in different file systems. The server addressing information 143 provides addressing information to data in a storage pool 162c . . . 162r identified by the storage pool identifier 146 from the storage management server 120. The storage agent addressing information 145 provides addressing information to data in a storage pool 162c . . . 162r identified by the storage pool identifier 146 from the storage agent 170b . . . 170p identified by the storage agent identifier 144.

An administrative computer 180 may be used by a system administrator or other user to communicate with storage management server 120 via administrative interface 132.

The communication paths 150 and 190 may each comprise any type of communication path, such as a network. Examples of networks include a Storage Area Network (SAN), a Local Area Network (LAN), Wide Area Network (WAN), the Internet, an Intranet, etc. A SAN may be described as a high-speed sub-network of shared storage devices. The Internet is a world-wide collection of connected computer networks (i.e., a network of networks).

Figure 2:
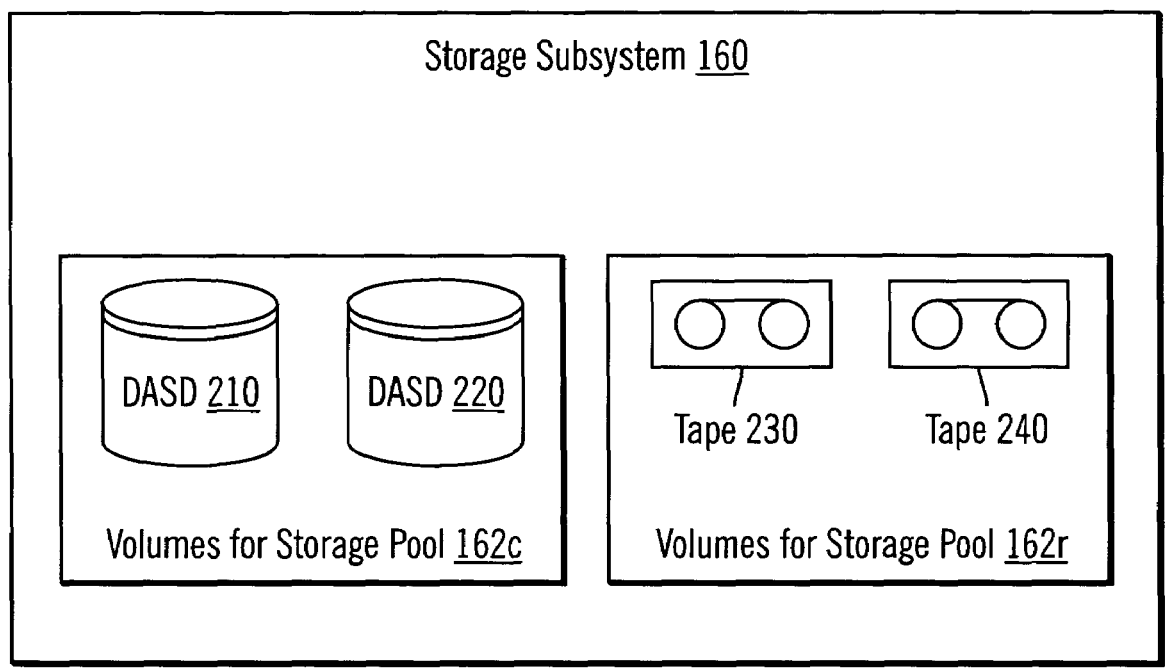
FIG. 2 illustrates, in a block diagram, volumes for a storage pool in accordance with certain implementations of the invention.

FIG. 2 illustrates, in a block diagram, volumes for storage pool 162c in accordance with certain implementations of the invention. The storage subsystem 160 may include any type of storage device or sub group of storage devices (e.g., Network Attached Storage (NAS) or other sub storage pool), and the storage devices illustrated in FIG. 2 are specified merely as examples. In certain implementations, the storage pool 162c includes volumes on different storage devices.

The storage subsystem 160 includes disk and tape storage. In this example, storage pool 162c includes volumes on Direct Access Storage Device (DASD) subsystem(s) 210 and DASD subsystem(s) 220, while storage pool 162r includes volumes on tape subsystem(s) 230 and tape subsystem(s) 240.

Figure 3:
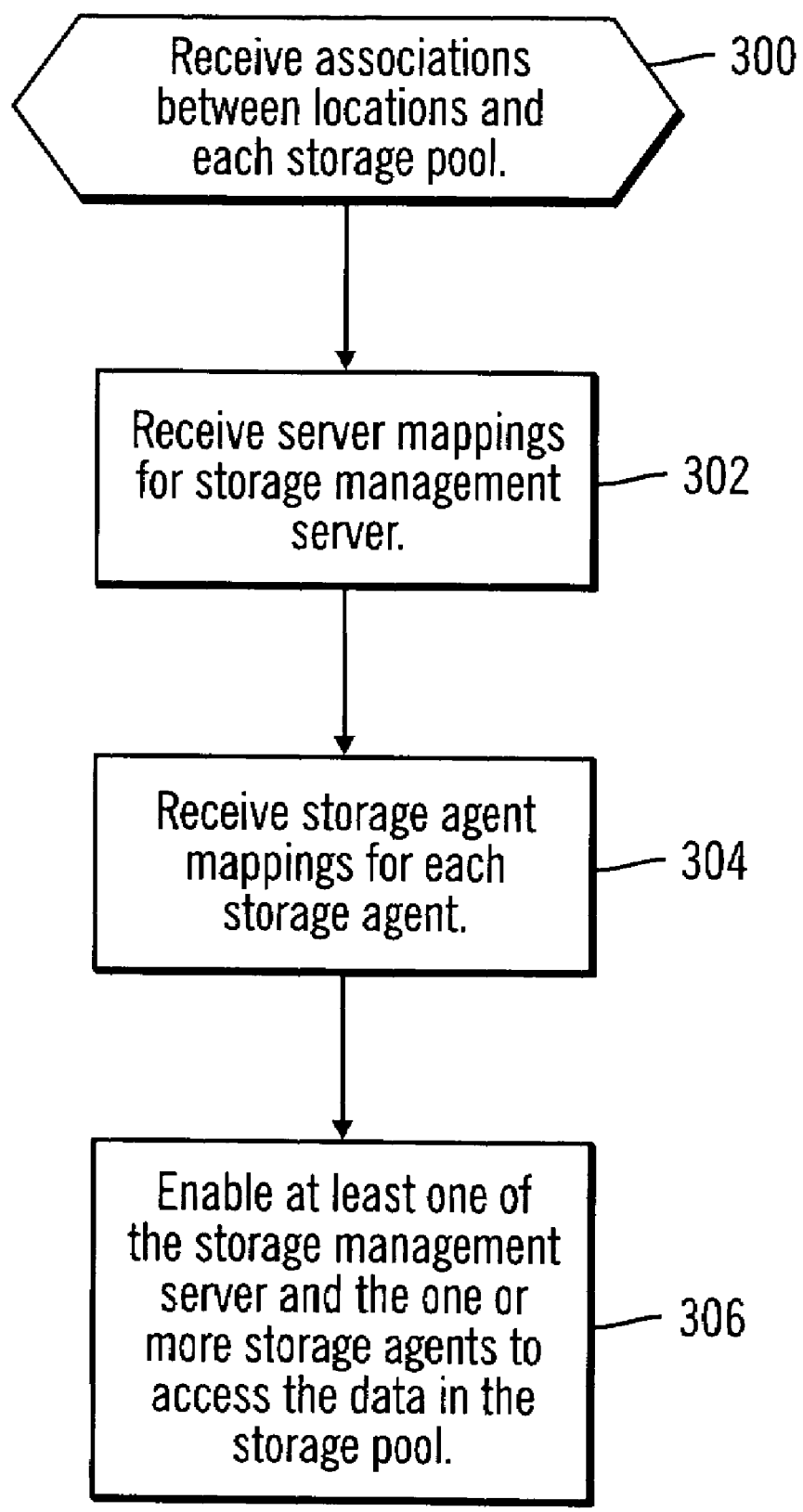
FIG. 3 illustrates logic for creating mappings in accordance with certain implementations of the invention.

FIG. 3 illustrates logic for creating mappings in accordance with certain implementations of the invention. Control begins at block 300 with the storage manager 130 receiving associations between locations in storage subsystem 160 and each storage pool 162c . . . 162r. This information is used to populate table 141 with locations 142 and storage pool identifiers 146. The associations are provided by a system administrator or other user at administrative computer 180 using the administrative interface 132. The associations indicate which devices and locations in storage subsystem 160 are to be part of a particular storage pool 162c . . . 162r. The storage manager 130 provides the administrative interface 132 for associating storage pools 162c . . . 162r with locations.

In block 302, the storage manager 130 receives server mappings that indicate server addressing information to data in each storage pool 162c . . . 162r. The server addressing information is used by the storage management server 120 to access the data. The server mappings are used to populate table 141 with server addressing information 143. The server mappings are provided by a system administrator or other user at administrative computer 180 using the administrative interface 132. In block 304, the storage manager 130 receives storage agent mappings for each storage agent 170b . . . 170p that indicate storage agent identifiers and storage agent addressing information for data in each storage pool 162c . . . 162r. The storage agent addressing information is used by the storage agents 170b . . . 170p to access the data. The storage agent mappings are used to populate table 141 with storage agent identifiers 144 and storage agent addressing information 145. The storage agent mappings are provided by a system administrator or other user at administrative computer 180 using the administrative interface 132. In block 306, the storage manager 130 enables at least one of the storage management server 120 and the one or more storage agents 170b . . . 170p to access the data in the storage pools 162c . . . 162r. Each of the storage management server 120 and the one or more storage agents 170b . . . 170p access the data in the storage pools 162c . . . 162r via different addressing information. In certain implementations, the storage management server 120 and the one or more storage agents 170b . . . 170p access the data in the storage pools 162c . . . 162r simultaneously via different addressing information.

With the processing of FIG. 3, table 141 is populated with data so that a storage pool 162c . . . 162r is associated with multiple locations (i.e., each row of table 141 provides a location 142 and an associated storage pool identifier 146). The multiple locations may span multiple file systems or may span multiple directories within a single file system. The server addressing information 143 and storage agent addressing information 145 provide access to the same locations in a storage pool 162c . . . 162r from different systems (e.g., the storage management server 120 and storage agents 170b . . . 170p). Thus, implementations of the invention enable the storage pools 162c . . . . 162r to be accessed via the storage management server 120 or via storage agents 170b . . . 170p simultaneously.

An example will be provided herein for better understanding of implementations of the invention. The example provides sample command syntax, but one skilled in the art would recognize that other command syntax is within the scope of the invention. In the example, storage management server 120 can store data as part of a single storage pool named "xyz" in the following locations 142, specified as a list of directories:

D:\storage\dir1
C:\storage\dir2
C:\storage\dir3

Also, in the example, storage agents 170b (named "SYSTEMB") and 170p (named "SYSTEMC") have access to the same physical storage on the SAN as storage management server 120. In this example, storage agent 170b uses a UNIX® operating system that has a file system that addresses the physical storage with the following storage agent addressing information 145:

/storageB/dir1 /storageB/dir2 /storageB/dir3

Also, in this example, storage agent 170p uses a Windows® operating system that has a file system that addresses the physical storage with the following storage agent addressing information 145:

\\storageShare\dir1    \\storageShare\dir2
\\storageShare\dir3

With the processing of block 302, to define server mappings for this example, the following server mapping command may be issued from a command line at the administrative computer 180 or via the administrative interface 132:

DEFINE SERVER MAPPING
STORAGE POOL xyz
DIR=D:\storage\dir1,
    C:\storage\dir2,
    C:\storage\dir3

With the above definition of the server mapping, server addressing information 143 "D:\storage\dir1,C:\storage\dir2,C:\storage\dir3" is mapped to the locations of storage pool "xyz". Thus, the server mapping command defines the storage management server's view of the physical storage.

With the processing of block 304, for storage agent 170b, to define storage agent mappings for storage agent "SYSTEMB", the following storage agent mapping commands may be issued from a command line at the administrative computer 180 or via the administrative interface 132:

DEFINE STORAGE AGENT MAPPING
STORAGE AGENT SYSTEMB
STORAGE POOL xyz
dir=/storageB/dir1,/storageB/dir2,/storageB/dir3

With the above definition of the storage agent mapping for storage agent "SYSTEMB", storage agent addressing information "dir=/storageB/dir1,/storageB/dir2,/storageB/dir3" is mapped to the locations of storage pool "xyz".

With the processing of block 304, to define storage agent mappings for storage agent "SYSTEMC", the following storage agent mapping commands may be issued from a command line at the administrative computer 180 or via the administrative interface 132:

DEFINE STORAGE AGENT MAPPING
STORAGE AGENT SYSTEMC
STORAGE POOL xyz
dir=\\storageShare\dir1,\\storageShare\dir2,
    \\storageShare\dir3

With the above definition of the storage agent mapping for storage agent "SYSTEMC", storage agent addressing information "dir=\\storageShare\dir1,\\storageShare\dir2,\\storageShare\dir3" is mapped to the locations of storage pool "xyz".

Figure 4:
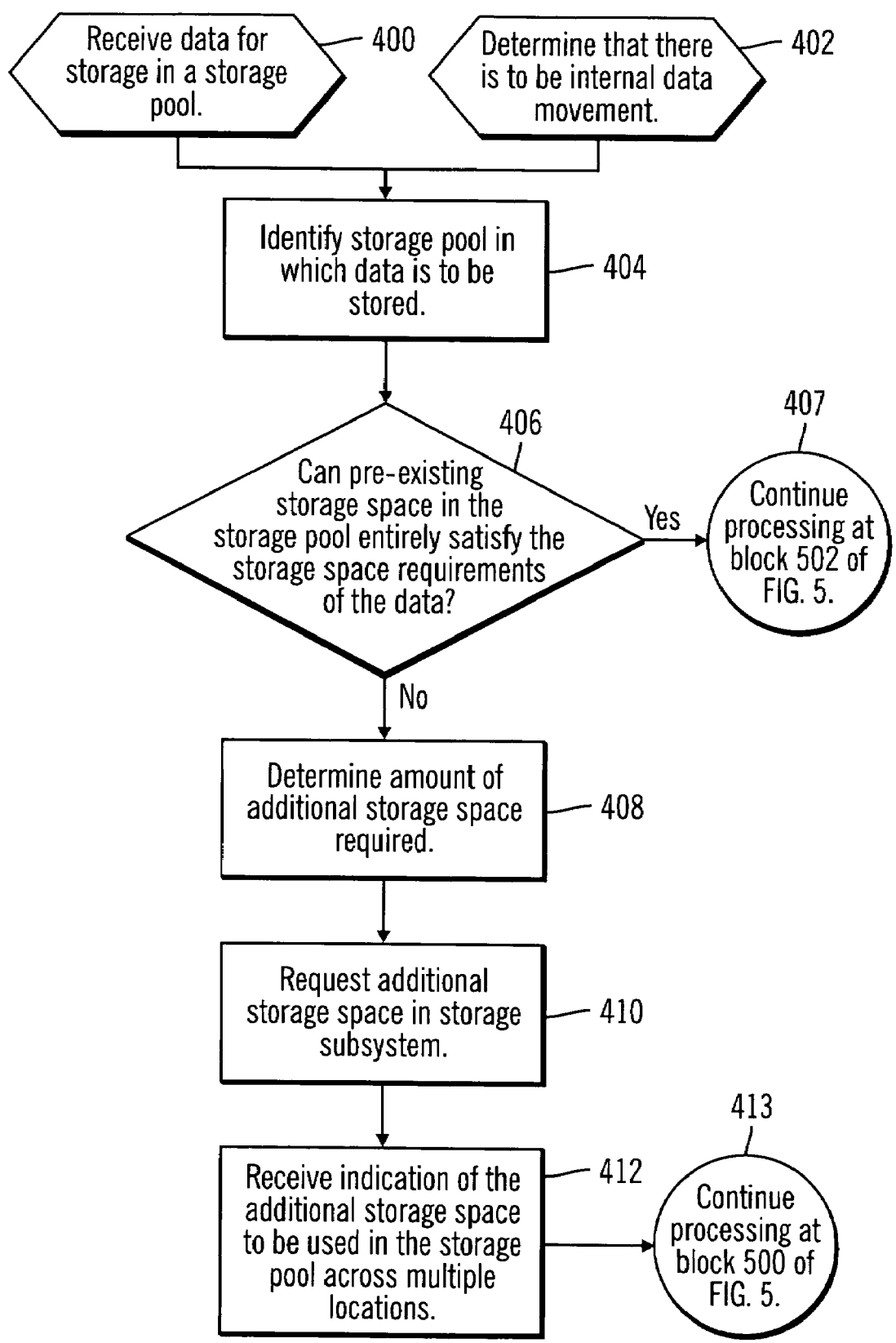
FIG. 4 illustrates logic for processing data requests in accordance with certain implementations of the invention.

FIG. 4 illustrates logic for processing data requests in accordance with certain implementations of the invention. The storage management server 120 may receive a request for storage of data within a storage pool 162c . . . 162r, and, if there is insufficient storage space in the storage pool 162c . . . 162r for all of the data, the storage management server 120 allocates pre-existing or additional storage space within the storage pool 162c . . . 162r using one or more allocation techniques. Also, the storage management server 120 may perform internal data movement. In this case, the storage management server 120 may move data to a storage pool 162c . . . 162r, and, if there is insufficient space in the storage pool 162c . . . 162r for all of the data, the storage management server 120 allocates pre-existing or additional space within the storage pool 162c . . . 162r using one or more allocation techniques. In particular, the storage management server 120 implements functions that move data within the storage management server 120 according to policies created by, for example, administrators. When this data movement occurs, the allocation techniques of implementations of the invention are also used in assigning storage space for the data movement. Thus, implementations provide the usage of multiple locations plus the use of allocation techniques in the context of storage management.

In FIG. 4, control begins at block 400 with the storage management server 120 receiving data for storage in a storage pool 162c . . . 162r (also referred to as a "target" storage pool) or at block 402 with the storage management server 120 determining that there is to be internal data movement. In block 404, the storage manager 130 identifies the storage pool 162c . . . 162r in which the data will be stored (e.g., using information provided by the storage management client 100a . . . 100n combined with policy definitions stored on the storage management server 120).

In block 406, the storage manager 130 determines whether pre-existing storage space in the identified storage pool 162c . . . 162r can entirely satisfy the storage space requirements of the data. If so, processing continues to block 502 of FIG. 5 (via block 407), otherwise, processing continues to block 408. Thus, when pre-existing storage space in the identified storage pool 162c . . . 162r can entirely satisfy the storage space requirements of the data, the allocation techniques of implementations of the invention are also used in assigning the pre-existing storage space (e.g., volumes) for storage management applications 110a . . . 110n and storage agents 170b . . . 170p communicating through the storage management server 120. For example, if volumes xx1, xx2, xx3 were explicitly created by an administrator in different locations, they are considered to be "pre-existing" storage space (rather than "additional" storage space) available for use by storage management applications 110a . . . 110n and storage agents 170b . . . 170p of the storage management server 120. These volumes are assigned for use using the allocation techniques in the same manner as adding additional storage space.

In block 408, the storage manager 130 determines the amount of additional storage space required. In certain implementations, if there is not enough storage space in the storage pool 162c . . . 162r to entirely satisfy the storage space requirements of the data, the additional storage space allocated is the amount exceeding an amount of storage space that is available in the storage pool 162c . . . 162r to meet the storage space requirements of the data. For example, if 100 megabytes of storage space is required, and a storage pool 162c . . . 162r has 75 megabytes of storage space left, then only the additional 25 megabytes of storage space is allocated. In alternative implementations, if there is not enough storage space in the storage pool 162c . . . 162r to entirely satisfy the storage space requirements of the data, then the additional amount may be the entire amount. For example, 100 megabytes of storage space is required, and a storage pool 162c . . . 162r has 50 megabytes of storage space left, then the additional 100 megabytes of storage space may be allocated.

In block 410, the storage management server 120 requests additional storage space in the storage subsystem 160. The additional storage space is allocated across multiple locations, using one or more allocation techniques and will be described in further detail with reference to FIG. 5. The additional storage space may be described as storage space that has been "created" for the storage pool 162c . . . 162r (rather than being "assigned" from pre-existing storage space).

In block 412, the storage management server 120 receives an indication that additional storage space has been allocated to the storage pool 162c . . . 162r across multiple locations. In particular, the storage manager 130 allocates additional storage by allocating storage space to the storage pool 162c . . . 162r across multiple locations. From block 412, processing continues to block 500 of FIG. 5 (via block 413).

Figure 5:
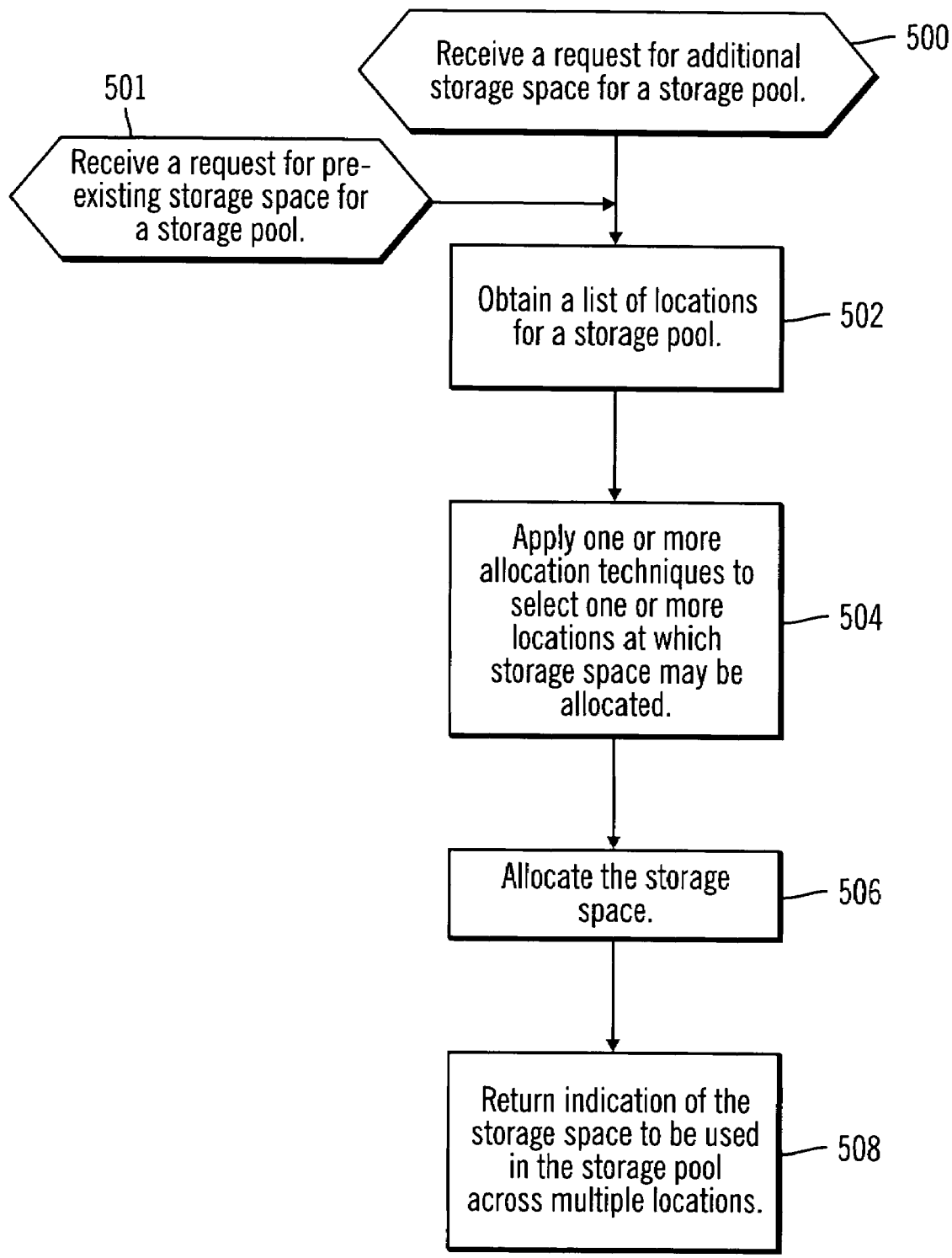
FIG. 5 illustrates logic for allocating storage space in accordance with certain implementations of the invention.

FIG. 5 illustrates logic for allocating storage space in accordance with certain implementations of the invention. Control begins at block 500 with the storage manager 130 receiving a request for additional storage space for a storage pool 162c . . . 162r or at block 501 with receipt of a request to allocate pre-existing storage space for the storage pool 162c . . . 162r. In block 502, the storage manager 130 obtains a list of locations for a storage pool from table 141. In certain implementations, the list of locations allows the storage pool 162c . . . 162r to span multiple file systems. In certain implementations, the list of locations allows the storage pool 162c . . . 162r to span multiple directories within a single file system. In block 504, the storage manager 130 applies one or more allocation techniques to select one or more locations at which storage space (e.g., volumes) are to be allocated. In block 506, the storage manager 130 allocates the storage space in the selected one or more locations. In block 508, the storage manager 130 returns an indication of the storage space to be used in the storage pool across multiple locations. The indication indicates addressing information to the storage space.

Thus, the locations 142 of storage pools listed in table 141 are used when allocation of pre-existing or additional storage space (e.g., new volumes) occurs. For example, the locations 142 are used to identify additional storage locations for a storage pool 162c . . . 162r when a new volume is pre-defined (i.e., "pre-existing" storage space) for later use and when volumes are dynamically created when it is determined (e.g., by the storage management server 120) that additional storage capacity is required. When the storage space is obtained, the locations 142 in combination with allocation techniques are used to determine the specific location of new volumes at one or more locations from the locations 142 specified in table 141.

In terms of the allocation techniques, the storage manager 130 may take into account various criteria in determining the placement of pre-existing or additional, dynamically created volumes amongst the multiple locations. The criteria may include, for example, storage usage requirements (e.g., multiple volumes may be allocated if a large amount of storage is required). One or more of the following allocation techniques may be used by the storage manager 130 to select one or more locations from the locations 142 specified in table 141:

1) round-robin amongst the locations
2) least-recently used location
3) location with the most available space
4) location with the highest performing file system
5) location with the most reliable or redundantly served file system
6) location with the least current load.
7) retrieval performance requirements of the data being stored matched to the physical characteristics of an individual location in the storage pool (e.g., the drives on which the file systems reside)

Other creation and placement techniques may also be used. For example, instead of using a server-wide round robin technique, the storage manager 130 may use a round-robin or least recently used technique for each node or file system. A node may be described as a computing device, such as storage management client 100a . . . 100n. A file system may be described as a logical storage space on a computing device (e.g., a storage agent 170b . . . 170p) that can contain a group of files. For example, for storage agents 170b . . . 170p using a Windows® operating system file system, a file system is a logical partition that is identified by a volume label. For storage agents 170b . . . 170p using a UNIX® operating system file system, a file system consists of any subset of directories and subdirectories. This would spread data for each node or file system across multiple locations, which may translate to different physical volumes, depending on the configuration.

Moreover, the storage manager 130 may track volume usage over time and create new volumes at locations with the least amount of usage over that period. The storage manager 130 may note which nodes are being restored simultaneously and ensure that volume allocation for these nodes is spread across multiple physical drives for better parallel restore performance. The storage manager 130 may allocate pre-existing or additional volumes for storage of data from an individual node by keeping data from different file systems in different locations to maximize the number of simultaneous restores that are possible, based on the file system of origin (i.e., the file system from which the data was backed up, which may also be described as the original file system of the data prior to being stored in the storage management server 120). The storage manager 130 may balance the number of active sessions storing data across the available locations. A session may be described as a connection between a storage management client 100a . . . 100n and the storage management server 120. An active session is one that is being used to transmit data between the storage management client 100a . . . 100n and the storage management server. The storage manager 130 may balance the number of active sessions storing or retrieving data across the available locations. The storage manager 130 may balance the amount of data being stored by active sessions across the available locations.

Figure 6:
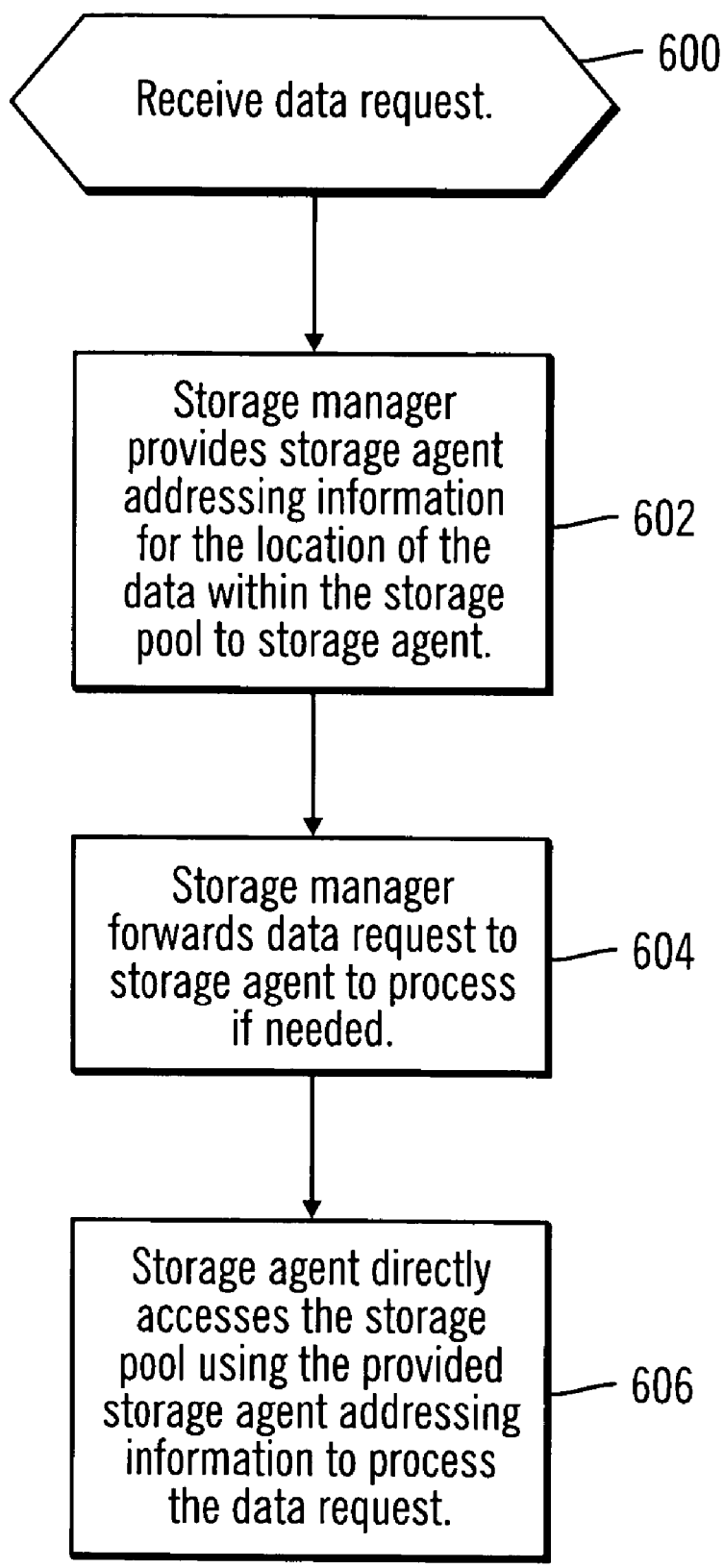
FIG. 6 illustrates logic for enabling storage agents to fulfill requests in accordance with certain implementations of the invention.

FIG. 6 illustrates logic for enabling storage agents to fulfill requests in accordance with certain implementations of the invention. Control begins at block 600 with the storage manager 130 receiving a data request (e.g., a request from a storage management client 100a . . . 100n to store data or retrieve data in a storage pool 162c . . . 162r in the storage subsystem 160 or a request for internal data movement at the storage management server 120). A data request may proceed from a storage management application 110a . . . 110n to the storage manager 130 or may proceed from the storage management application 110a ... 110n to a storage agent 170b ... 170p and from there to the storage manager 130. In certain implementations, when the data request proceeds from the storage management application 110a ... 110n to the storage manager 130, the storage manager 130 determines that the data request may be processed by a storage agent 170b ... 170p. The storage agent 170b ... 170p may be selected using various criteria (e.g., round robin, least busy, etc.).

In block 602, the storage manager 130 provides the storage agent 170b ... 170p with storage agent addressing information 145 for the location of the data (e.g., contained in a particular volume) within the storage pool 162c ... 162r. The storage manager 130 obtains the storage agent addressing information 145 and the location 142 (e.g., of the volume) using the storage agent mappings in table 141. In block 604, storage manager 130 forwards the data request to a storage agent 170b ... 170p to process, if needed. For example, if the data request proceeded from a storage management application 110a ... 110n to the storage manager 130, then the storage manager 130 would forward the data request to the storage agent 170b ... 170p. In block 606, the storage agent 170b ... 170p directly accesses the storage pool 162c ... 162r using the provided storage agent addressing information 145 to process the data request. If needed, the storage agent 170b ... 170p requests the storage manager 130 to allocate pre-existing or additional storage space to the storage pool 162c ... 162r using the locations 142 in table 141 and one or more allocation techniques.

For example, with reference to the example discussed above, if the data request to the storage management server 120 is to store data at D:\storage\dir1, then the storage manager 130 accesses the locations 142, locates server addressing information 143 corresponding to location D:\storage\dir1 and determines the storage agent addressing information 145 corresponding to the storage agent identifier 144 for the storage agent 170b ... 170p. For example, if the requesting storage agent were storage agent 170b using a UNIX® operating system file system, the storage manager 130 would determine that the corresponding storage agent addressing information for the storage pool is /storageB/dir1. Similarly, if the requesting storage agent were storage agent 170p using a using a Windows® operating system file system, the storage manager 130 would determine that the corresponding storage agent addressing information for the storage pool is \\storageShare\dir1. The storage agents 170b ... 170p would use their respective addressing information to access the location.

Thus, the locations 142 may be used in mapping views of locations from storage agents 170b ... 170p with independent access to the locations. The views of the locations are set up such that storage agents 170b ... 170p have access to the same storage pool 162c ... 162r with their multiple locations as does the storage management server 120. These storage agents 170b ... 170p at remote systems may create volumes in the same multiple locations of a storage pool 162c ... 162r such that the created volumes are usable by each storage agent 170b ... 170p and by the storage management server 120. The created volumes are independent of the physical means for accessing the shared data.

Figure 7:
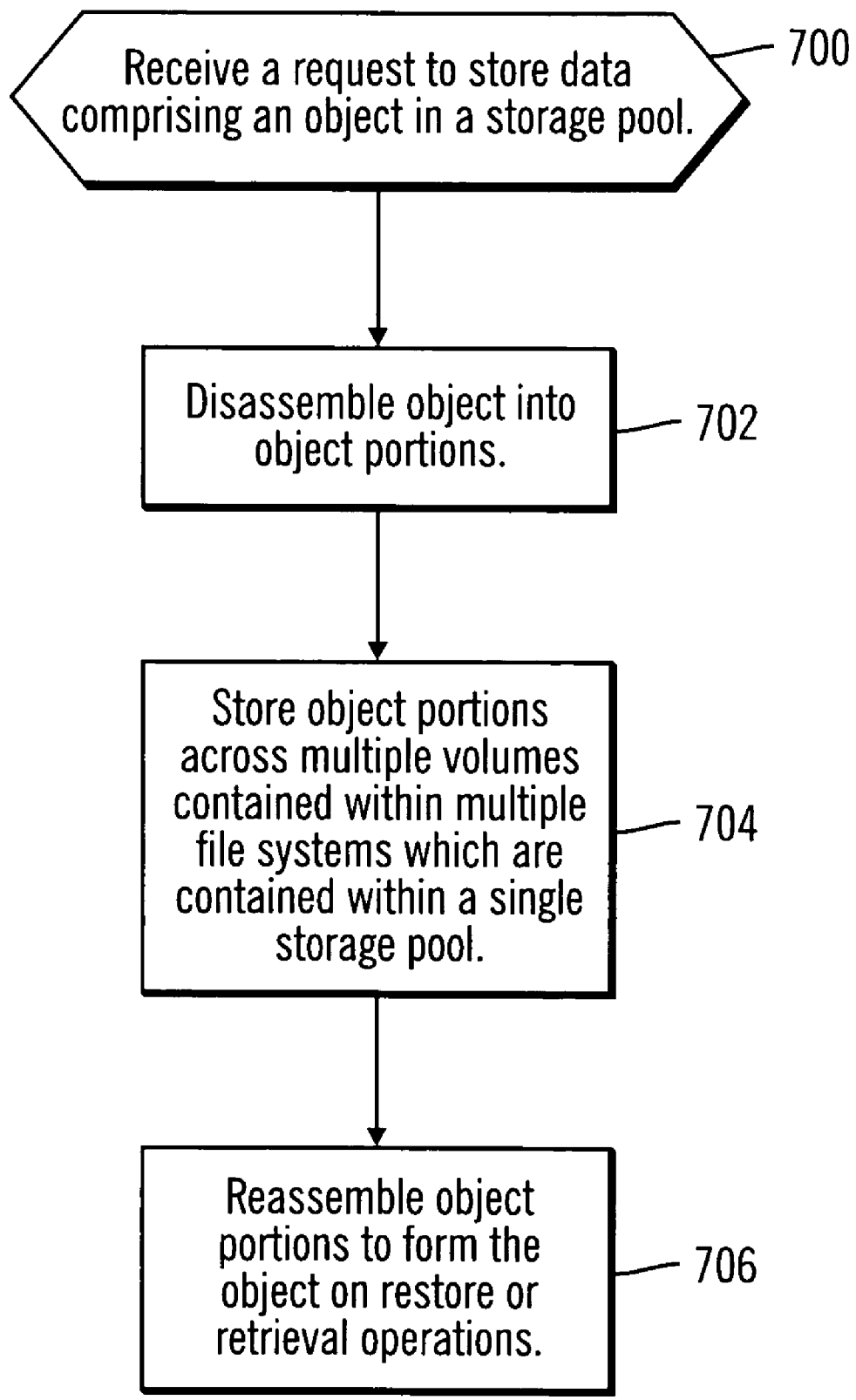
FIG. 7 illustrates logic for processing objects in accordance with certain implementations of the invention.

FIG. 7 illustrates logic for processing objects in accordance with certain implementations of the invention. Control begins at block 700 with the storage manager 130 receiving a request to store data comprising an object in a storage pool. The request may be from a storage management application 110a ... 110n or may be for internal data movement at the storage management server 120. In block 702, the storage manager 130 disassembles the object into object portions. In block 704, the storage manager stores the object portions across multiple volumes contained within multiple file systems that are contained within a single storage pool. Thus, the storage manager 130 is able to store objects in volumes in different locations for which there are server and storage agent mappings and is able to keep track of all of the portions of the objects (e.g., objects and sub-objects) using various tables. In block 706, the storage manager 130 reassembles the object portions to form the object on restore or retrieval operations. Thus, the allocation of a storage pool across multiple locations allows for overflow of object storage across multiple file systems and supports object storage in amounts larger than the limit on an individual file system.

Thus, implementations of the invention allow multiple locations to be associated with an individual storage pool using one or more allocation techniques to select the locations. Then, data may be stored in the multiple locations within the same storage pool. Volumes may be pre-allocated or dynamically created across multiple locations. Moreover, implementations of the invention allow storage agents to access the same data as a storage management server, even though the storage agents and storage management server implement different file systems. In addition, the number of locations for a storage pool is independent of the number of storage management clients that access data in the storage pool. For example, multiple locations could be implemented even if there were only a single storage management client.

Tivoli Storage Manager is a registered trademark or common law mark of International Business Machines Corporation in the United States and/or other countries. Windows is a registered trademark or common law mark of Microsoft Corporation in the United States and/or other countries. UNIX is a registered trademark or common law mark of The Open Group in the United States and/or other countries.

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3, 4, 5, 6, and 7 describes specific operations occurring in a particular order. In alternative implementations, certain of the logic operations may be performed in a different order, modified or removed. Moreover, operations may be added to the above described logic and stilt conform to the described implementations. Further, operations described herein may occur sequentially or certain operations may be processed in parallel, or operations described as performed by a single process may be performed by distributed processes.

The illustrated logic of FIGS. 3, 4, 5, 6, and 7 may be implemented in software, hardware, programmable and non-programmable gate array logic or in some combination of hardware, software, or gate array logic.

Figure 8:
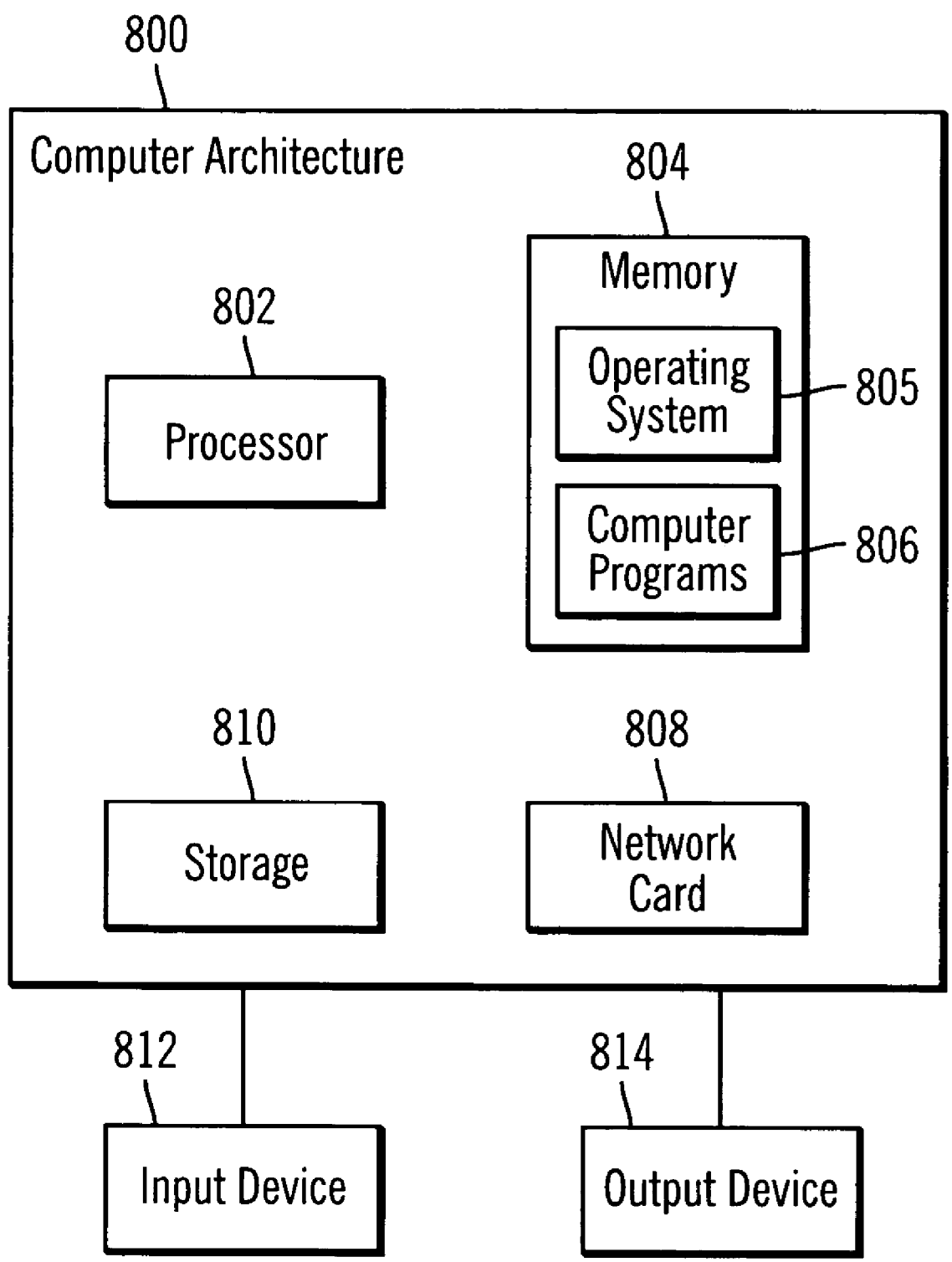
FIG. 8 illustrates an architecture of a computer system that may be used in accordance with certain implementations of the invention.

FIG. 8 illustrates an architecture 800 of a computer system that may be used in accordance with certain implementations of the invention. Storage management clients, storage management servers and/or administrative computers may implement computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for allocating storage space to a storage pool, comprising:

storing associations between locations on storage devices and a storage pool, wherein the storage pool is a grouping of volumes on the storage devices, wherein the storage pool spans at least one of multiple file systems and multiple directories within a file system, wherein each file system enables creation and management of files on the volumes on the storage devices and enables performing Input/Output (I/O) operations to those files, and wherein at least one of the file systems includes multiple directories;

receiving a request for storage space for the storage pool;

obtaining a list of locations associated with the storage pool, wherein the locations represent locations on the storage devices that are part of the storage pool;

applying one or more allocation techniques to select one or more locations from the list of locations at which storage space is to be allocated to the storage pool; and allocating the storage space at the selected one or more locations to the storage pool.

2. The method of claim 1, wherein pre-existing storage space is allocated.

3. The method of claim 1, wherein additional storage space is allocated.

4. The method of claim 1, wherein the allocated storage space comprises a combination of pre-existing storage space and additional storage space.

5. The method of claim 1, further comprising:

receiving associations between locations in a storage subsystem and the storage pool, wherein the associations indicate which devices in the storage subsystem are to be part of the storage pool.

6. The method of claim 1, further comprising:

receiving server mappings that map server addressing information to the locations in the storage pool; and receiving storage agent mappings that map storage agent addressing information to the locations in the storage pool.

7. The method of claim 1, further comprising:

enabling a storage management server and one or more storage agents to access data at a location in the storage pool simultaneously via different addressing information, wherein the different addressing information is associated with different file systems.

8. The method of claim 1, wherein the allocation technique matches retrieval performance requirements of the data being stored to physical characteristics of an individual location in the storage pool.

9. The method of claim 1, further comprising:

receiving a data request for the storage pool; and forwarding storage agent addressing information for the location of the data within the storage pool to a storage agent.

10. The method of claim 1, further comprising:
receiving a request to store data comprising an object in the storage pool;
disassembling the object into object portions; and
storing the object portions across multiple file systems contained within the storage pool.

11. The method of claim 10, wherein the object has a size larger than a limit on an individual file system.

12. The method of claim 10, further comprising:

reassembling the object portions to form the object on restore or retrieval operations.

* * * * *